(12) United States Patent
Ohhashi

(10) Patent No.: US 10,846,037 B2
(45) Date of Patent: Nov. 24, 2020

(54) IMAGE FORMING APPARATUS AND IMAGE FORMING SYSTEM CAPABLE OF CHANGING A PRINT SETTING IN A RECEIVED PRINT JOB

(71) Applicant: BROTHER KOGYO KABUSHIKI KAISHA, Nagoya-shi, Aichi (JP)

(72) Inventor: Masashi Ohhashi, Kasugai (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/531,198

(22) Filed: Aug. 5, 2019

(65) Prior Publication Data

US 2020/0050412 A1 Feb. 13, 2020

(30) Foreign Application Priority Data

Aug. 10, 2018 (JP) .................................. 2018-151231

(51) Int. Cl.
*G06F 3/12* (2006.01)

(52) U.S. Cl.
CPC .......... *G06F 3/1258* (2013.01); *G06F 3/1256* (2013.01); *G06F 3/1285* (2013.01)

(58) Field of Classification Search
CPC .................................................... G06F 3/1258
USPC ....................................................... 358/1.15
See application file for complete search history.

(56) References Cited

U.S. PATENT DOCUMENTS

2006/0092453 A1* 5/2006 Okada ................ H04N 1/00482
358/1.14

FOREIGN PATENT DOCUMENTS

JP 2011-131604 A 7/2011

* cited by examiner

*Primary Examiner* — Jacky X Zheng
(74) *Attorney, Agent, or Firm* — Scully, Scott, Murphy & Presser, PC

(57) ABSTRACT

An image forming apparatus, having a communication interface, an image forming device, a user interface, a memory, and a controller, is provided. The controller controls the user interface to display a print standby screen including a specific object, on condition that received reservable print job data indicates a first parameter being applied to the received reservable print job. The controller controls the image forming device to print images for the reservable print job in compliance with the first parameter when the execution instructing operation is rendered through the user interface without accompanying an operation to the specific object in the print standby screen, but controls the image forming device to print images for the reservable print job in compliance with a second parameter when the operation to the specific object in the print standby screen and the execution instructing operation are rendered through the user interface.

5 Claims, 8 Drawing Sheets

IMAGE FORMING APPARATUS AND IMAGE FORMING SYSTEM CAPABLE OF CHANGING A PRINT SETTING IN A RECEIVED PRINT JOB

CROSS REFERENCE TO RELATED APPLICATION

This application claims priority under 35 U.S.C. § 119 from Japanese Patent Application No. 2018-151231, filed on Aug. 10, 2018, the entire subject matter of which is incorporated herein by reference.

BACKGROUND

Technical Field

The present disclosure is related to an aspect of an image forming apparatus and an image forming system providing a printing function. In particular, the present disclosure is related to a technic to change a print setting for a print job after the print job is transmitted from an external device and received in an image forming apparatus.

Related Art

A technic to change a print setting for a print job once received in an image forming apparatus from an external device such as a personal computer (PC) is known. For example, the image forming apparatus may authenticate data for a secured print job and thereafter perform a part of the secured print job in a certain print setting for trial. A user may view the outcome of the part of the secured print job and may wish to change the print setting. The image forming apparatus may accept the change and print images for a regular (non-trial) secured print job according to the changed print setting.

SUMMARY

According to the known technic, the user may change the print setting after conducting the trial printing and before conducting the regular printing. However, in order to provide the chance for changing the print setting to the user, the image forming apparatus may lead the user to a user interface screen for changing the print setting each time in midst of a print job, which the user may find redundant or disturbing. Moreover, the user interface screen may present a list of items of print settings that are changeable to the user while the user may need to change solely one of the print settings. In such a case, the user may find the operation for changing the print settings troublesome.

The present disclosure is advantageous in that a technic, which enables an image forming apparatus to change a print setting for a print job easily after receiving the print job, is provided.

According to an aspect of the present disclosure, an image forming apparatus, having a communication interface, an image forming device, a user interface, a memory, and a controller, is provided. The controller is configured to, in response to receiving of reservable print job data constituting a reservable print job through the communication interface, execute a print standby screen displaying process, in which the controller controls the user interface to display a print standby screen. The user interface displaying the print standby screen is acceptable of an execution instructing operation for the reservable print job rendered in the print standby screen. The controller is configured to control the user interface to display a specific object in the print standby screen on condition that the received reservable print job data indicates a first parameter being applied to the received reservable print job. The reservable print job is a print job to be saved temporarily in the memory without being used for image printing by the image forming device directly upon reception through the communication interface but to be used by the image forming device for image printing in response to the executing instructing operation accepted through the user interface. The controller is further configured to, in response to the execution instructing operation being rendered through the user interface without accompanying an operation to the specific object in the print standby screen, execute a reservation printing process, in which the controller controls the image forming device to print images for the reservable print job, in compliance with the first parameter. The controller is configured to, in response to the operation to the specific object in the print standby screen and the execution instructing operation being rendered through the user interface, execute the reservation printing process in compliance with the second parameter.

According to another aspect of the present disclosure, an image forming apparatus, having a communication interface, an image forming device, a user interface, a memory, and a controller, is provided. The controller is configured to, when print job data constituting a print job is received through the communication interface, and on condition that the received print job data indicates a first parameter being applied to the print job, execute a print-in-progress screen displaying process, in which the controller controls the user interface to display a print-in-progress screen including a specific object while the image forming device is in progress of image printing for the print job. The controller is further configured to, in response to an operation to the specific object in the print-in-progress screen through the user interface rendered before completion of the image printing for the print job, execute a print resuming process, in which the controller aborts the image printing in compliance with the first parameter and controls the image forming device to print images for the print job in compliance with a second parameter.

According to another aspect of the present disclosure, an image forming system, having an image forming apparatus including a first communication interface and a first user interface, and an external device including a second communication interface and a second user interface, is provided. The external device is configured to transmit reservable print job data constituting a reservable print job through the second communication interface to the image forming apparatus. The reservable print job is a print job to be saved temporarily in a memory in the image forming apparatus without being used for image printing by an image forming device in the image forming apparatus directly upon reception through the first communication interface but to be used by the image forming device for image printing in response to an executing instructing operation accepted in the image forming apparatus through the first user interface. The image forming apparatus is configured to, in response to receiving of the reservable print job data from the external device through the first communication interface, display a print standby screen in the first user interface. The first user interface displaying the print standby screen is acceptable of an execution instructing operation for the reservable print job. The image forming apparatus is configured to, on condition that the received reservable print job data indicates a first parameter being applied to the received reservable print job, control the first user interface to further display a specific object in the print standby screen. The image forming apparatus is configured to, in response to the execution instructing operation being rendered through the first user interface without accompanying an operation to the specific object in the print standby screen, control the image forming device to print images for the reservable print job in compliance with the first parameter. The image forming apparatus is configured to, in response to the operation to the specific object in the print standby screen and the execution instructing operation are rendered through the first user interface, control the image forming device to print the images for the reservable print job in compliance with a second parameter.

According to another aspect of the present disclosure, an image forming system, having an image forming apparatus with a first communication interface and a first user interface, and an external device comprising a second communication interface and a second user interface, is provided. The external device is configured to transmit print job data constituting a print job through the second communication interface to the image forming apparatus. The image forming apparatus is configured to, when the print job data from the external device is received through the first communication interface, and on condition that the received print job data indicates a first parameter being applied to the received reservable print job, display a print-in-progress screen including a specific object in the first user interface while the image forming device is in progress of image printing for the print job. The image forming apparatus is further configured to, in response to an operation to the specific object in the print-in-progress screen through the first user interface rendered before completion of the image printing for the print job, abort the image printing in compliance with the first parameter and control the image forming device to print images for the print job in compliance with a second parameter.

BRIEF DESCRIPTION OF THE ACCOMPANYING DRAWINGS

DETAILED DESCRIPTION

Hereinafter, an exemplary embodiment according to the present disclosure will be described in detail with reference to the accompanying drawings. It is noted that various connections may be set forth between the elements in the following description. These connections in general and, unless specified otherwise, may be direct or indirect, and this specification is not intended to be limiting in this respect. Aspects of the present disclosure may be implemented on one or more CPUs, one or more circuits, including ASICs, and a combination of any of these, or in computer software as programs storable in computer-readable media including, but not limited to, RAMs, ROMs, flash memories, EPROMs, CD-media, DVD-media, temporary storage, hard disk drives, floppy drives, permanent storage, and the like.

In the following paragraphs, described will be an image forming system that includes a PC and a multifunction peripheral (MFP) providing an image forming function.

Figure 1:
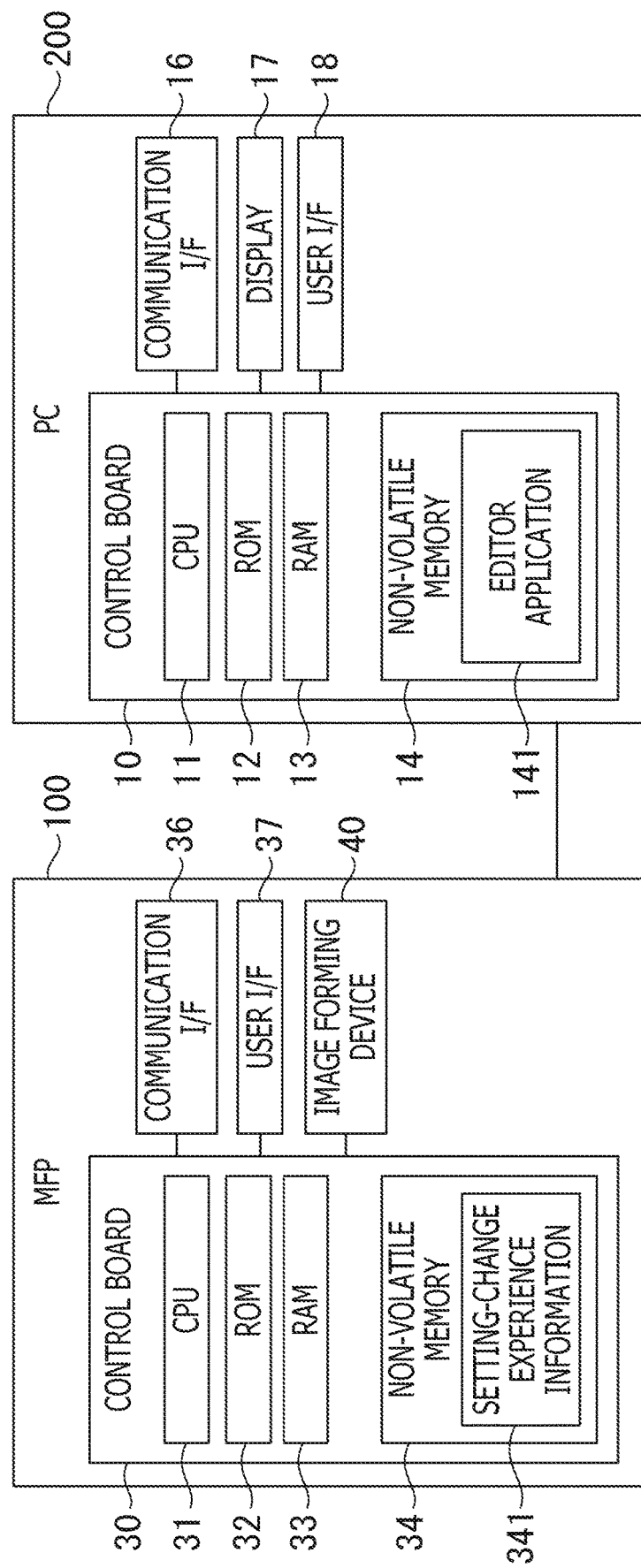
FIG. 1 is a block diagram to illustrate an electrical configuration of an image forming system according to an embodiment of the present disclosure.

The image forming system in the present embodiment includes, as shown in FIG. 1, an MFP 100 and a PC 200, which are connected for communication with each other. The MFP 100 may receive image data from an external device (e.g., PC 200) and form an image based on the image data on a printing medium. The PC 200 may provide a variety of functions including a data transmitting function to transmit image data to the MFP 100. The external device may include, for a smartphone or a tablet computer.

An electrical configuration of the MFP 100 will be described below. The MFP 100 includes, as shown in FIG. 1, a control board 30 including a CPU 31, a ROM 32, a RAM 33, and a non-volatile memory 34. Moreover, the MFP 10 includes a communication interface (I/F) 36, a user I/F 37, and an image forming device 40, which are electrically connected with the control board 30. Optionally, the MFP 100 may further be equipped with functions other than the image forming function such as an image reading function.

The CPU 31 may conduct processes according to programs called from the ROM 32 or the non-volatile memory 34 and according to the user's input. The ROM 32 stores programs including a booting program to boot the MFP 100. The RAM 33 may serve as a work area to be used by the processes conducted by the CPU 31 and a memory area to store data temporarily. The non-volatile memory 34 may include, for example, an HDD and a flash memory, which may serve as a work area for the processes to be conducted by the CPU 31 and a storage area to store data temporarily. Optionally, the CPU 31 may have a CPU buffer to serve as a memory.

The ROM 32, the RAM 33, and the non-volatile memory 34 are non-transitory computer-readable and tangible storage media. Non-transitory computer-readable and tangible storage media may further include, for example, CD-ROM and DVD-ROM. In this regard, while electric signals to convey a program to be downloaded from an external device such as a server through the Internet may be a computer-readable signal medium, the electric signals are not regarded as a non-transitory computer readable storage medium.

The communication I/F 36 includes a configuration that enables the MFP 100 to communicate with an external device including the PC 200. The MFP 100 may support a plurality of different communication protocols. In this regard, the communication I/F 36 may include a plurality of hardware devices that support different communication protocols.

The user I/F 37 may include, for example, a touch panel that may both display messages and accept operations rendered by a user. Alternately, the user I/F 37 may be a combination of a display that does not accept the user's operations and an input device such as input keys including numerical keys and a start key, through which the user's operations may be rendered.

The image forming device 40 includes a configuration to form an image on a sheet. The image forming device 40 may form an image in any of a variety of image forming formats, including, for example, an inkjet image-forming and an electrophotographic image-forming. Moreover, the image forming device 40 may be a multicolor image forming device or a monochrome image forming device. Furthermore, the MFP 100 may include a plurality of image forming devices 40 that may form images in different image-forming formats.

The image forming device 40 in the MFP 100 according to the present embodiment is capable of double-sided printing, i.e., forming images on both sides of a sheet. For double-sided printing, the image forming device 40 may, for example, convey the sheet to print an image on one side, invert the sheet upside down within the MFP 100 to form an image on the other side, and eject the sheet with the images formed on the both sides thereof outside the MFP 100. The MFP 100 includes a sheet conveyer (not shown) to convey and invert the sheet, which enables double-sided printing and single-sided printing for the MFP 100 to form image(s) on either two sides or a single side of the sheet.

An electrical configuration of the PC 200 will be described in the following paragraphs. The PC 200 includes, as shown in FIG. 1, a control board 10 including a CPU 11, a ROM 12, a RAM 13, and a non-volatile memory 14. Moreover, the PC 200 includes a communication I/F 16, a display 17, and a user interface (I/F) 18, which are connected with the control board 10.

The CPU 11 may conduct processes according to programs called from the ROM 12 or the non-volatile memory 14 and according to a user's input. The ROM 12 stores programs including a booting program to boot the PC 200. The RAM 13 may serve as a work area to be used by the processes conducted by the CPU 11 and a memory area to store data temporarily. The non-volatile memory 14 may include, for example, an HDD and a flash memory, which may serve as a storage area to store programs, data such as image data and document data, and information for settings.

The communication I/F 16 includes a hardware configuration that enables the PC 200 to communicate with the MFP 100. The communication I/F 16 may be in compliance with wireless and/or wired communication protocol(s). The PC 200 may support a plurality of different communication protocols. In this regard, the communication I/F 16 may include a plurality of hardware devices that support different communication protocols.

The display 17 includes a hardware device capable of displaying information on a screen. The user I/F 18 includes a hardware device such as a keyboard and a mouse that are capable of accepting input operations from the user. In other words, a combination of the display 17 and the user I/F 18 may each serve as a user interface. Optionally, the PC 200 may have a touch panel that may serve as both the display 17 and the user I/F 18.

In the PC 200, installed is an application program that may issue a print-execution instruction. The PC 200 receiving the print-execution instruction from the application program may generate a print job and transmit print job data constituting the generated print job to the MFP 100. The print job may include a plurality of print settings. The non-volatile memory 14 in the PC 200 may have, for example, an editor application 141 being an application program for editing documents and images installed therein. The PC 100 may receive a print-execution instruction while the editor application 141 is active.

It may be noted that each of the control board 10 and the control board 30 shown in FIG. 1 is a collection of hardware device(s) and software program(s) that may be used to control the PC 200 and the MFP 100, respectively. In other words, the control board 10 and the control board 30 may not necessarily represent single hardware devices that are disposed in the PC 200 and the MFP 100, respectively.

Next, in the following paragraphs, described will be activities in the image forming system according to the embodiment of the present disclosure. In the image forming system, the print job data to be transmitted from the PC 200 to the MFP 100 includes a plurality of items of print settings for the print job. The items of the print settings may include, for example, a setting of printing side(s), i.e., double-sided printing or single-sided printing, a selection of a printing medium, and a print resolution. For each of the items, a plurality of optional parameters may be prepared, and one of the plurality of optional parameters for each item may be selected exclusively. For example, for the setting of printing side(s), a parameter to set double-sided printing and a parameter to set the single-sided printing may be prepared; therefore, when one of the parameters (e.g., double-sided printing) is selected, the other of the parameters (e.g., single-sided printing) is invalidated. For another example, for the selection of printing medium, parameters for different-sized the printing media and parameters for trays in the MFP 100 may be prepared.

The PC 200 may append the print settings to image data to be printed and generate a print job. Meanwhile, some of the items of the print settings may be explicitly selected by the user, and some other items of the print settings may not always be explicitly selected by the user. For those items that are not explicitly selected by the user, the PC 200 may adopt default parameters as default settings. The default settings may be adopted, for example, automatically by a printer driver for the MFP 100 installed in the PC 200. The default settings may vary depending on models of the MFP 100 and/or versions of the printer driver; therefore, the default settings may be different from settings expected by the user. For example, when the user uses a newly released MFP 100 for the first time without checking through the default settings, the MFP 100 may deliver a printed outcome appearing differently form the user's expected image.

The MFP 100 according to the present embodiment may accept a change to a print setting for a print job consisting of print job data received from an external device even after the print job data is completely received in the MFP 100. In order to accept such a change, the MFP 100 may display an image containing a button, through which the change to the print setting is acceptable, in the user I/F 37. If an operation to the button is rendered, the MFP 100 may change the print setting for the received print job and print the image in the changed print setting. For example, a default setting adopted for a print setting item in the MFP 100 of a current model may be different from a default setting adopted for the same print setting item in the MFP 100 of an older model. In this regard, the MFP 100 may display an image containing a button, through which a change to the print setting is acceptable, in the user I/F 37. In the following paragraphs, described will be activities of the MFP 100 and the PC 200 when a print job includes a print setting of double-sided printing, and the MFP 100 accepts a change to the print setting from double-sided printing to the single-sided printing.

A print job consisting of print data received from the PC 200 includes a reservable print job and a non-reservable print job. The reservable print job is a print job, which is received from the PC 200 and saved temporarily in the RAM 33 in the MFP 100, and by which image printing is executed in response to receipt of an execution instruction through the user I/F 37 of the MFP 100. The MFP 100 receiving the print job data constituting the reservable print job may save the received print job in the RAM 33 and refrain from printing an image until an execution instructing operation is rendered through the user I/F 37. In other words, receiving of the reservable print job through the communication I/F 36 in the MFP 100 may not directly or immediately cause the image forming device 40 to print the image. On the other hand, the MFP 100 receiving print job data constituting a non-reservable print job may execute image printing without waiting for an execution instruction. In other words, the non-reservable print job received in the MFP 100 through the communication I/F 36 may cause directly or immediately cause the image forming device 40 to print the image.

While a reservable print job is stored in the RAM 33, the user may render an operation to select the reservable print job through the user I/F. When the operation to select the reservable print job is rendered, the MFP 100 may accept the selection and display a screen containing a button, through which an operation to instruct the MFP 100 to execute the selected reservable print job may be rendered, in the user I/F 37. In particular, if the selected reservable print job has the print setting of double-sided printing, the MFP 100 may display a screen containing a button, through which an instruction for changing the print setting to single-sided printing is acceptable, in the user I/F 37. On the other hand, if the selected reservable print job has the print setting of single-sided printing, the MFP 100 may display a screen containing a button, through which an instruction for print-start is acceptable, in the user I/F 37. In this case, the screen may not contain the button, through which the instruction for changing the print setting to single-sided printing is acceptable.

Figure 2:
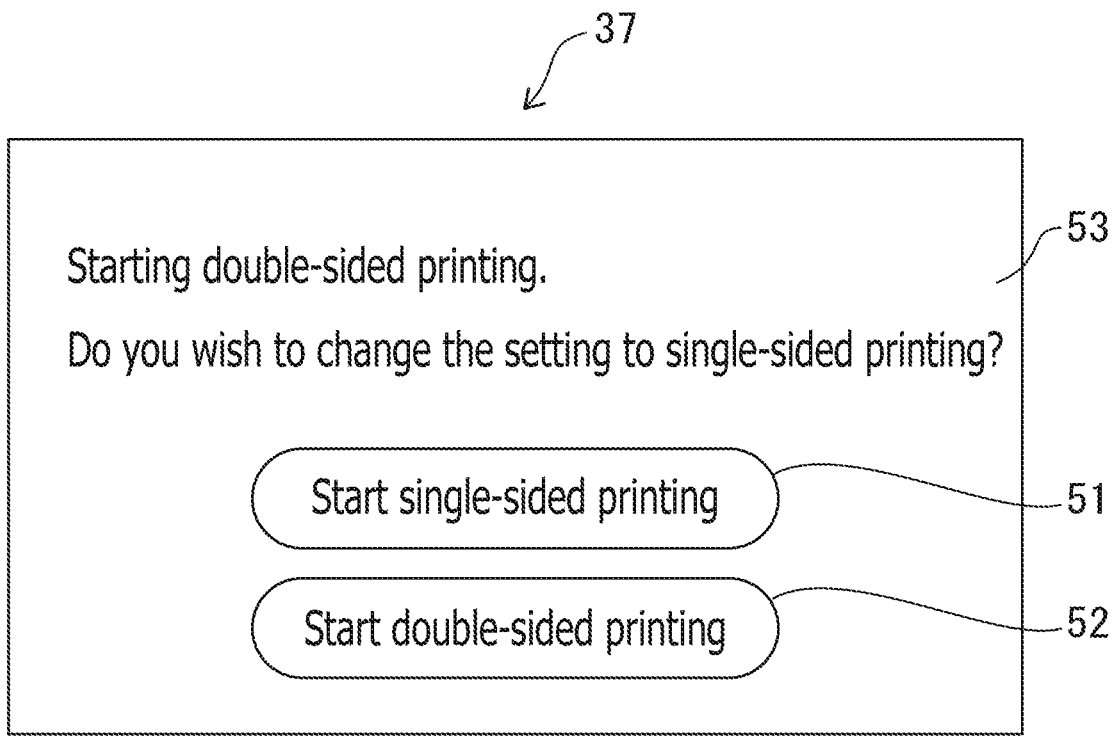
FIG. 2 is an illustrative view of a screen including a button, through which an instruction for changing a print setting to single-sided printing is acceptable, according to the embodiment of the present disclosure.

For example, if a reservable print job with a print setting of double-sided printing is selected through the user I/F 37, the MFP 100 displays a screen 53, as shown in FIG. 2, containing a button 51, through which a print-start instruction for starting image printing in the print setting of single-sided printing is acceptable, and a button 52, through which a print-start instruction for starting image printing in the print setting of double-sided printing is acceptable, in the user I/F 37. If, for example, an operation to the button 51 is rendered, the MFP 100 accepts the instruction and switches the print setting for the print job from double-sided printing to single-sided printing and starts printing images. The operation to the button 51 and the operation to the button 52 in the screen 53 may each be accepted as an execution instructing operation to instruct the MFP 100 to execute image printing and may be rendered explicitly against each other.

For another example, the MFP 100 may receive print job data consisting of a non-reservable print job, and the received non-reservable print job may have a print setting of double-sided printing. In such a case, the MFP 100 may display a screen containing a button, through which a change to the print setting is acceptable, in the user I/F 37 while image printing for the print job is in progress. Meanwhile, the MFP 100 may receive print job data consisting of a non-reservable print job, and the received non-reservable print job may have a print setting of single-sided printing. In such a case, the MFP 100 may not display the screen containing the button, through which a change to the print setting is acceptable, in the user I/F 37 while image printing for the print job is in progress.

Figure 3:
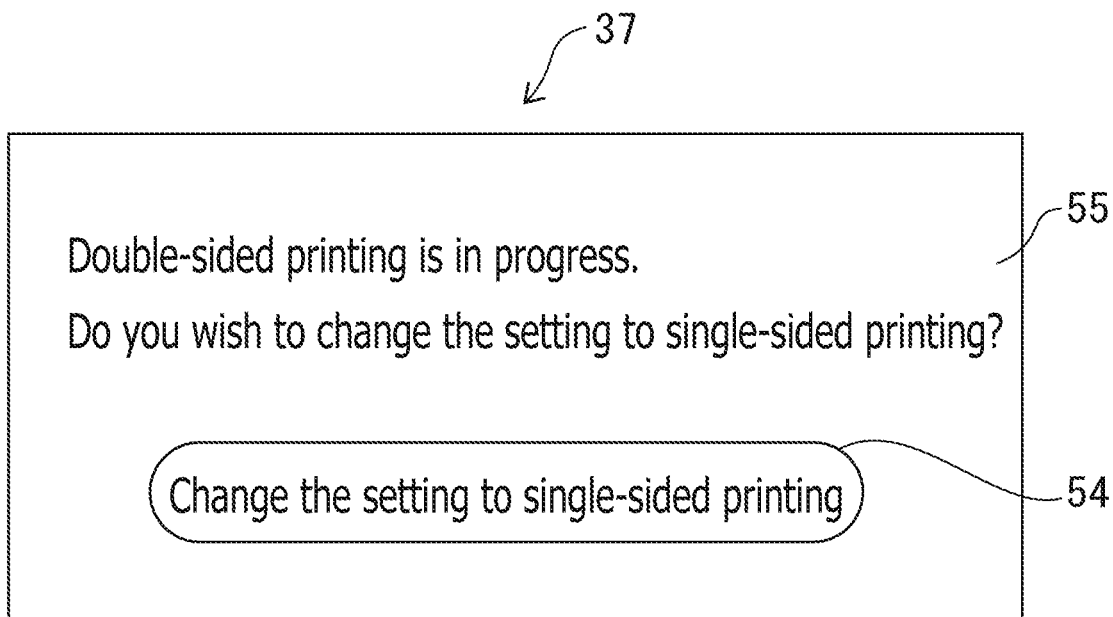
FIG. 3 is an illustrative view of a screen including a button, through which an instruction for changing a print setting to single-sided printing is acceptable, according to the embodiment of the present disclosure.

In particular, while image printing for the print job with the print setting of double-sided printing is in progress, the MFP 100 displays a screen 55, as shown in FIG. 3, containing a button 54, through which an instruction for changing the print setting to single-sided printing is acceptable, in the user I/F 37. If an operation to the button 54 is rendered, the MFP 100 accepts the instruction and switches the print setting from double-sided printing to single-sided printing. The MFP 100 may, for example, abort the image printing being in progress and restart the image printing in the print setting of single-sided printing from the first page. For another example, the MFP 100 may resume the image printing for the print job for the remaining unprinted pages with the changed print setting, i.e., not in double-sided printing but in single-sided printing.

Next, described below with reference to flowcharts in FIGS. 4-8 will be activities of the MFP 100 and the PC 200 to change the print settings. First, described with reference to FIG. 4 will be a main process to be conducted by the MFP 100. The main process may be triggered by activation of the MFP 100.

The steps in the processes and the flowcharts described in the following paragraphs may represent processes to be conducted by the CPU 31 or the CPU 11 acting in compliance with instructions described in the programs stored in the MFP 100 or the PC 200. In other words, terms to express the actions of the MFP 100 or the PC 200 such as judging, extracting, selecting, calculating, determining, specifying, obtaining, accepting, and controlling may represent processes conducted by the CPU 31 or the CPU 11. The processes to be conducted by the CPU 31 and the CPU 11 may include controlling hardware devices using the APIs in the OSs of the MFP 100 and the PC 200. In the following description, however, actions by the CPU 31 or the CPU 11 caused by a program may not necessarily be described explicitly refer to the interventions of the OS or the API. In other words, an expression such as "a program B controls a hardware device C" may mean to describe an event "a program B controls a hardware device C using the API in the OS." Moreover, an action in a process conducted by the CPU 31 or the CPU 11 in compliance with an instruction described in the program may be expressed as an action rendered by the CPU 11 or the CPU 31, e.g., "the CPU 11 conducts a process" or "the CPU 31 conducts a process."

Moreover, an act of obtaining may not necessarily be limited to a result of requesting. In other words, the CPU 31 or the CPU 11 may receive data without requesting the data, and the act of receiving may still be expressed as "the CPU 31 obtains the data" or "the CPU 11 obtains the data." Moreover, a term "data" in the present disclosure may mean a bit string readable by a computer. Data units containing substantially the same contents but in different formats may be handled as a same data unit, and a term "information"

may be regarded similarly. Terms for actions of "requesting," "instructing," and "commanding" may represent outputting information that indicates the request, the instruction, and the command, respectively, to another party. Meanwhile, the information that indicates the request, the instruction, and the command may be expressed by terms "request," "instruction," and "command," respectively.

Moreover, a process conducted by the CPU 31 or the CPU 11 to determine, for example, whether information "A" indicates occurrence of "B" may be described in an expression such as "the CPU 31/CPU 11 determines occurrence of "B" based on information "A." Further, a process conducted by the CPU 31 or the CPU 11 to determine, for example, whether information "A" indicates occurrence of "B" or "C" may be described in an expression such as "the CPU 31/CPU 11 determines whether "B" occurs or "C" occurs.

Figure 4:
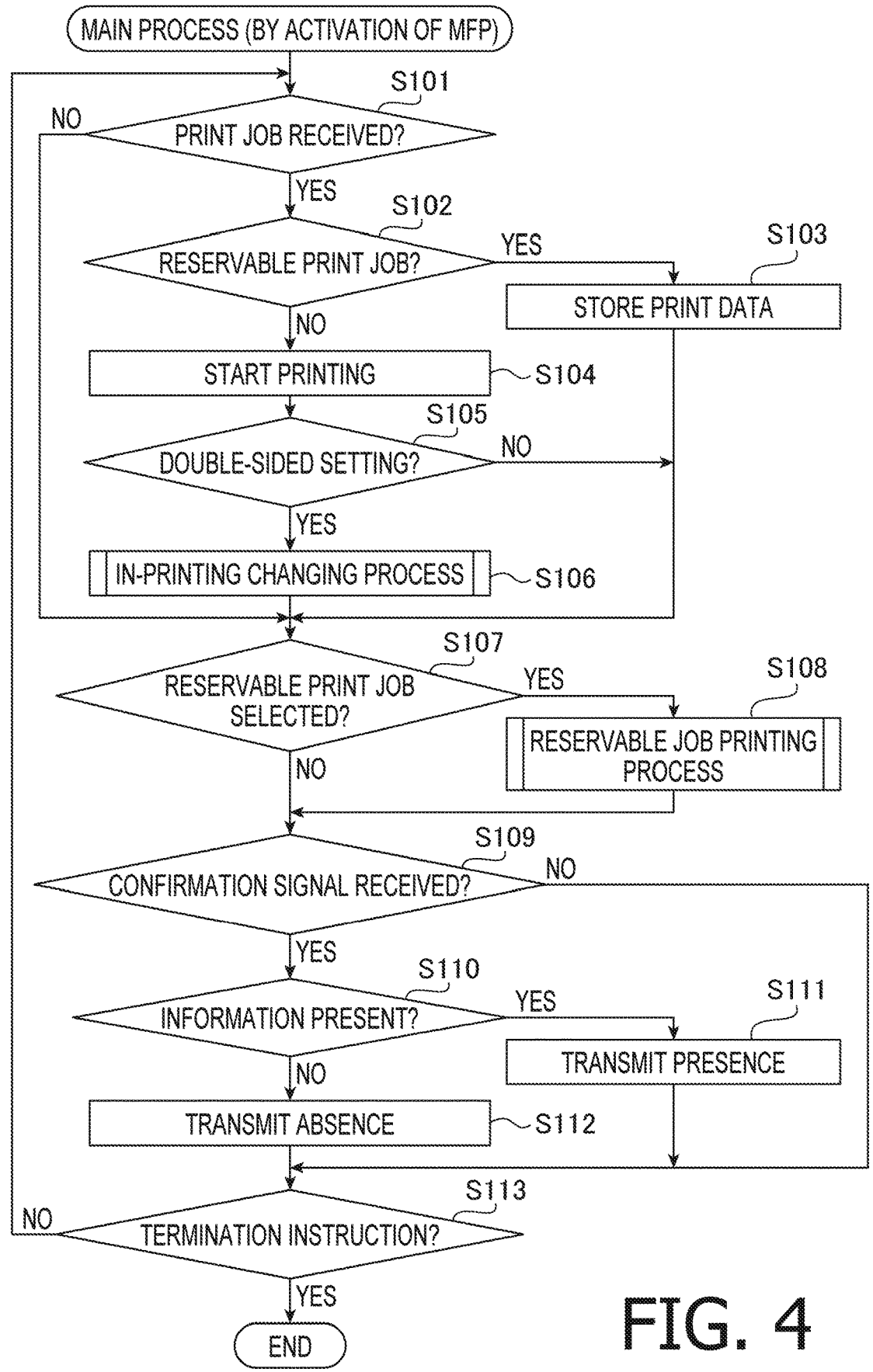
FIG. 4 is a flowchart to illustrate steps in a main process to be conducted in an MFP according to the embodiment of the present disclosure.

The main process will be described below with reference to FIG. 4. In S101, the CPU 31 determines whether print job data is received. If the CPU 31 determines that the print job data is received (S101: YES), in S102, the CPU 31 determines whether the received print job data is data for a reservable print job or a non-reservable print job. For example, the CPU 100 may determine whether the received print data is data for a reservable print job with reference to information indicating a print setting included in the print job data. If the CPU 31 determines that the received print job data is data for a reservable print job (S102: YES), in S103, the CPU 31 stores the data for the received print job in the RAM 33.

In S102, on the other hand, if the CPU 31 determines that the received print job data is not data for a reservable print job (S102: NO), in S104, the CPU 31 controls the image forming device 40 to start printing images based on the received print job data. If the image forming device 40 is occupied by processes for another print job received in the past, the image forming device 40 may start the image printing for the received print job after the processes for the print job received in the past are completed.

In S105, the CPU 31 determines whether a print setting for the print job started in S104 is double-sided printing. The CPU 31 may determine the print setting for the print job started in S104 with reference to information indicating the print setting included in the print job data. If the CPU 31 determines that the print setting is double-sided printing (S105: YES), in S106, the CPU 31 conducts an in-printing changing process, in which an instruction for changing the print setting in the print job is acceptable after printing of the images is started and is in progress.

Figure 5:
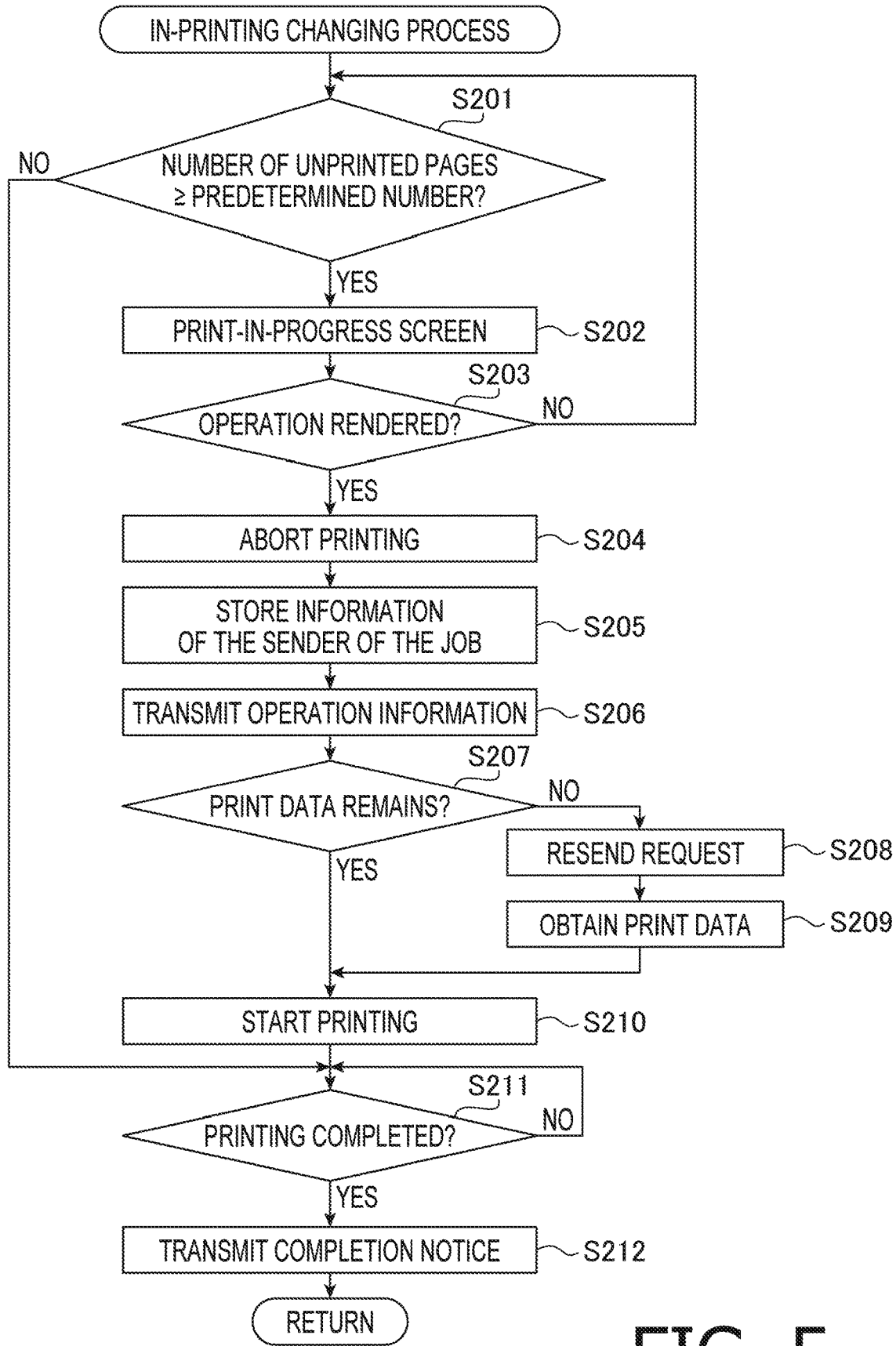
FIG. 5 is a flowchart to illustrate steps in an in-printing changing process to be conducted in the MFP according to the embodiment of the present disclosure.

With reference to FIG. 5, described below will be steps in the in-printing changing process. In S201, the CPU 31 determines whether a number of unprinted pages is larger than or equal to a predetermined number. The unprinted pages are pages of images to be printed on sheets that are not yet conveyed. For example, if a print job requires printing images on two or less page(s), a number of sheet(s) to be used for the print job in double-sided printing is one (1). Therefore, at the time when image printing starts in S104 in the main process, no unprinted page remains. Once the sheet conveyer starts conveying a sheet, the MFP 100 cannot convey the sheet in reverse; therefore, when a number of the unprinted pages is small, there is substantially no time that may allow a change in the print setting while the print job is in progress.

In S201, if the CPU 31 determines that the number of unprinted pages is larger than or equal to the predetermined number (S201: YES), in S202, the CPU 31 controls the user I/F 37 to display a print-in-progress screen. The print-in-progress screen may include, for example, a message, which indicates that double-sided printing is in progress, and a button 54, through which an instruction for changing the print setting to single-sided printing is acceptable, as shown in a screen 55 in FIG. 3.

In S203, the CPU 31 determines whether an operation to the button 54 is rendered. If the CPU 31 determines that no operation to the button 54 is rendered (S203: NO), the CPU 31 returns to S201 and waits until the number of unprinted pages lowers to be smaller than the predetermined number (S201: NO) or until an operation to the button 54 is rendered (S203: YES).

In S203, if the CPU 31 determines that an operation to the button 54 is rendered (S203: YES), in S204, the CPU 31 controls the user I/F 37 to close the screen 55 having been displayed since S202 and abort the image printing. For example, the CPU 31 may restrain the sheet conveyer from newly starting to convey a sheet. Meanwhile, for the sheet(s) that are already being conveyed, image printing may either be continued or discontinued as long as the sheet(s) that are already being conveyed are ejected outside the MFP 100.

In S205, the CPU 31 stores identifying information of the external device being the sender of the print job data for the print job currently in progress in the non-volatile memory 34. For example, if the print job data for the print job was received from the PC 200, the CPU 31 stores identifying information of the PC 200 in the non-volatile memory 34. In particular, the CPU 31 stores information to identify the external device that transmitted the print job data as setting-change experience information 341 in the non-volatile memory 34. The setting-change experience information 341 is usable in order to determine a print setting for a future print job that may be received form the same external device. Activities by the PC 200 to use the setting-change experience information 341 will be described further below.

The identifying information of the external device to be stored as the setting-change experience information 341 may include, for example, a name of the external device, a serial number of the external device, and a name of a user associated with the external device. When, for example, the print job data includes information concerning the user who created the print job, the information concerning the user may be stored as the setting-change experience information 341. For another example, the identifying information of the external device may be a sender address (e.g., IP address, MAC address, etc.) of the external device.

In S206, the CPU 31 transmits operation information to the external device, which is the sender of the print job data for the print job being in progress, through the communication I/F 36. The operation information indicates the occurrence of the operation rendered to the button 54 in the screen 55. Activities by the PC 200 to use the operation information will be described further below in detail.

In S207, the CPU 31 determines whether the print data for the print job remains. In particular, the CPU 31 determines whether the entire print data for the print job that was aborted in S204 is stored in the RAM 33. For example, the MFP 100 may delete a part of the print data as soon as a part of the image for the part of the print data is printed on a sheet. In such a case, the MFP 100 may not have the entire print data in the RAM 33, but the part of the print data may have been deleted. On the other hand, for another example, the MFP 100 may keep the entire print data until entire image printing on sheets for the print job is completed. In such a case, the entire print data may remain in the RAM 33. In this regard, if at least a part of the print data is deleted, the CPU 31 determines negatively in S207 (S207: NO).

If the CPU 31 determines that the print data for the print job is not stored (S207: NO), in S208, the CPU 31 transmits a resend request to the external device being the sender of the print job data for sending the print data once again through the communication I/F 36. In S209, the CPU 31 obtains the print data from the external device through the communication I/F 36. In this regard, the external device does not delete the print data after sending the print data to the MFP 100 until the external device receives a completion notice from the MFP 100. Meanwhile, for example, if the MFP 100 is configured to always keep the entire print data until the entire image printing on the sheets is completed, the external device may delete the print job after sending the print job data without waiting for the completion notice. Activities by the PC 200 as the external device in relation with the completion notice will be described further below in detail.

Following either S209 or an affirmative determination in S207 that the entire print data remains (S207: YES), in S210, the CPU 31 controls the image forming device 40 to resume printing images for the print data. In S210, the images are printed in the print setting having been changed, i.e., in single-sided printing. Meanwhile, after requesting for the print data in S208, if the CPU 31 fails to obtain the print data from the external device, the CPU 31 may control the user I/F 37 to display a message notifying the user of the failure and terminate the in-printing changing process without starting the image printing.

Following either S210 or a negative determination in S201 that the number of unprinted pages is smaller than the predetermined number (S201: NO), in S211, the CPU 31 determines whether the image printing is completed. In other words, if no predetermined number of unprinted pages remains at the time when the in-printing changing process started, the CPU 31 does not display the screen 55 containing the button 54 but continues the image printing until the images are completely printed. In this occasion, the CPU 31 may either display no screen at all or may display another screen that does not contain the button 54.

Meanwhile, after displaying the screen 55 in S202, making a negative determination in S203 that no operation to the button 55 is rendered, and if the CPU 31 determines in S201 that no predetermined number of unprinted pages remains (S201: NO), in S211, the CPU 31 may control the user I/F 37 to close the screen 55 having been displayed since S202.

In S211, if the CPU 31 determines that the image printing is not completed (S211: NO), the CPU 31 controls the image forming device 40 to continue printing until the images for the print job data is completely printed. If the CPU 31 determines that the image printing is completed (S211: YES), in S212, the CPU 31 transmits the completion notice to the external device being the sender of the print job data for the current print job. The CPU 31 exits the in-printing changing process and returns to the main process.

In the in-print changing process in FIG. 5, in S202, the determination whether the print-in-progress screen should be displayed may not necessarily made depending on the determination in S201 whether the number of unprinted pages is larger than or equal to the predetermined number, but the determination in S202 may be made, for example, depending on a determination, whether an amount of the data for the unprinted pages is larger than or equal to a predetermined amount. For another example, the determination in S202 may be made depending on a determination whether a length of time required to print the images for the unprinted pages is longer than or equal to a predetermined length.

For another example, in place of the determination whether the number of unprinted pages is larger than or equal to the predetermined number in S201, a determination whether a printable amount per unit of time for the image printing is larger or equal to a predetermined amount may be made. If, for example, a determination that the printable amount per unit of time is neither larger than nor equal to the predetermined amount, the flow may proceed to S202, and if a determination that the printable amount per unit of time is larger than or equal to the predetermined amount, the flow may proceed to S211.

A printable amount per unit of time may tend to increase when, for example, printing in a monochrome setting and in a lower resolution setting, in which images may be printed in a faster speed. The CPU 31 may determine whether the printable amount per unit of time for the print job is larger by, for example, referring to the print settings included in the print job data. On the other hand, printing in a multicolor setting and in a higher resolution setting may tend to lower a printing speed, and duration of the runtime from the start to the end of the image printing may tend to be longer. Therefore, while image printing, in which the printable amount per unit of time is smaller, is in progress, a change to the print setting may likely be accepted through the button in the print-in-progress screen which is displayed after starting of the image printing.

For another example, in the in-printing changing process shown in FIG. 5, in response to the operation rendered to the button 54 (S203: YES), the image printing may not necessarily be aborted (S204) and the print data may not necessarily be retrieved from the external device (S209). In particular, the pages that are already printed on the sheets may not necessarily be repeated for the single-sided printing, but merely images for the unprinted pages may be printed in the setting of single-sided printing. In other words, the steps S204 and S207-S209 in the in-printing changing process may be omitted so that the CPU 31 may complete the ongoing image printing for the current page and may continue printing the images for the unprinted pages in the setting of single-sided printing. In this flow, the CPU 31 may not necessarily request for the print data to obtain for the second time. In this regard, the PC 200 may not necessarily store the print data without deleting until the image printing is completed in the MFP 100.

Referring back to FIG. 4, the main process will further be described. Following one of a negative determination in S101, in which the CPU 31 determines that the print job data is not received (S101: NO), S103, a negative determination in S105, in which the CPU 31 determines that the print setting is not double-sided printing (S105: NO), and S106, in S107, the CPU 31 determines whether a selection for a reservable print job is made. The MFP 100 may, when print data for the reservable print job is stored, accept a selecting instruction for a selection of the reservable print job through the user I/F 37. If the reservable print job is a secured job, the MFP 100 may activate an authenticating process and may accept the selection for the reservable print job in a limited case where the user is successfully authenticated.

In S107, if the CPU 31 determines that the selection for the reservable print job is accepted (S107: YES), in S108, the CPU 31 conducts a reservable job printing process, in which image printing based on the print data constituting the reservable print job is conducted, and in which a changing instruction for changing the print setting is acceptable before the image printing starts.

Figure 6:
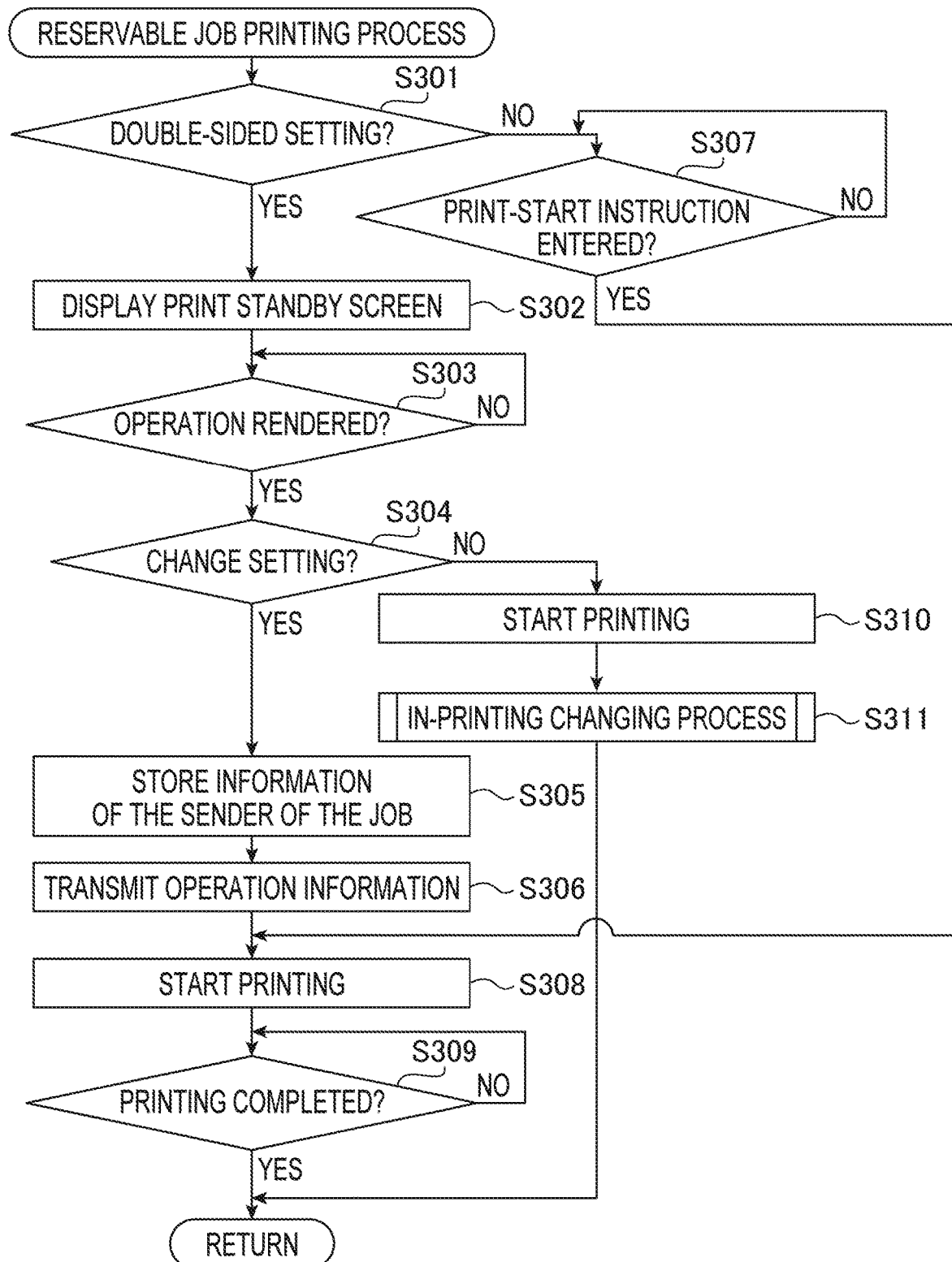
FIG. 6 is a flowchart to illustrate steps in a reservable job printing process to be conducted in the MFP according to the embodiment of the present disclosure.

With reference to FIG. 6, described below will be steps in the reservable job printing process. In S301, the CPU 31 determines whether the print setting for the selected reservable print job is double-sided printing. The CPU 31 may determine the print setting by, for example, referring to the print setting included in the print job data. If the CPU 31 determines that the print setting is double-sided printing (S301: YES), in S302, the CPU 31 controls the user I/F 37 to display a print standby screen. The print standby screen may include, for example, as shown in the screen 53 in FIG. 2, a message, which explains that the current reservable print job is in the print setting of double-sided printing, and the button 51, through which a print-start instruction for starting image printing in the print setting of single-sided printing is acceptable, and the button 52, through which a print-start instruction for starting image printing in the print setting of double-sided printing is acceptable, in the user I/F 37.

In S303, the CPU 31 determines whether an operation to either the button 51 or the button 52 in the screen 53 being displayed is rendered. If the CPU 31 determines that no operation to the buttons 51, 52 is rendered (S303: NO), the CPU 31 waits until an operation to either the button 51 or the button 52 is rendered. Optionally, the screen 53 may include a button, through which cancellation of the reservable print job is acceptable.

If the CPU 31 determines that an operation to either the button 51 or the button 52 is rendered (S303: YES), in S304, the CPU 31 determines whether the operation is an instruction for changing the print setting. In particular, if the operation to the button 51 is rendered, the CPU 31 determines that the operation is an instruction for changing the print setting, and if the operation to the button 52 is rendered, the CPU 31 determines that the operation is an instruction not for changing but for maintaining the print setting.

In S304, if the CPU 31 determines that the operation is an instruction for changing the print setting (S304: YES), in S305, the CPU 31 stores identifying information of the external device being the sender of the print job data for the selected reservable print job in the non-volatile memory 34. The action in S305 may be similar to the action in S205. In S306, the CPU 31 transmits the operation information to the external device, which is the sender of the print job data for the reservable print job being in progress, through the communication I/F 36. The action in S306 may be similar to the action in S206.

In S301, on the other hand, if the CPU 31 determines that no operation to the button 51 or the button 52 is rendered (S301: NO), in S307, the CPU 31 determines whether a print-start instruction for starting image printing is entered. If the CPU 31 determines that no print-start instruction for starting image printing is entered (S307: NO), the CPU 31 waits until the instruction is entered. In particular, if the selected reservable print job has a print setting other than double-sided printing, the CPU 31 may control the user I/F 37 to display a print standby screen containing a button, through which a print-start instruction for starting image printing is acceptable, in the user I/F 37 to accept the print-start instruction for starting image printing. The print standby screen may not contain a button, through which an instruction for changing the print setting is acceptable.

In S307, if the CPU 31 determines that a print-start instruction for starting image printing is entered (S307: YES), or following S306, in S308, the CPU 31 controls the user I/F 37 to close the print standby screen having been displayed since S302 and controls the image forming device 40 to start printing the images. In particular, in S308, the CPU 31 controls the image forming device 40 to print the images in the print setting of single-sided printing.

In S309, the CPU 31 determines whether the image printing is completed. If the CPU 31 determines that the image printing is incomplete (S309: NO), the CPU 31 controls the image forming device 40 to continue the image printing until the images are completely printed. If the CPU 31 determines that the image printing is completed (S309: YES), the CPU 31 exits the reservable job printing process and returns to the main process.

On the other hand, in S304, if the CPU 31 determines that the operation rendered is not an instruction for changing the print setting (S304: NO), in S310, the CPU 31 controls the user I/F 37 to close the print standby screen having been displayed since S302 and controls the image forming device 40 to start printing the images. In particular, in S310, the CPU 31 controls the image forming device 40 to print the images in the print setting of double-sided printing. In S311, the CPU 31 conducts the in-printing changing process (see FIG. 5) described earlier. After finishing through the in-printing changing process, the CPU 31 exits the reservable job printing process and returns to the main process.

Referring back to FIG. 4, the main process will further be described. In S107, if the CPU 31 determines that no selection for the reservable print job is accepted (S107: NO), or following S108, in S109, the CPU 31 determines whether a confirmation signal from the external device (e.g., the PC 200) is received. The confirmation signal will be described in detail further below.

If the CPU 31 determines that the confirmation signal is received (S109: YES), in S110, the CPU 31 determines whether the setting-change experience information 341 in the non-volatile memory 34 includes information to match information that identifies the external device being a sender of the confirmation signal. If the CPU 31 determines that the setting-change experience information 341 includes the matching information to identify the external device (S110: YES), in S111, the CPU 31 transmits a reply signal indicating presence of the matching information to the external device through the communication I/F 36. If the CPU 31 determines that the setting-change experience information 341 includes no matching information to identify the external device (S110: NO), in S112, the CPU 31 transmits a reply signal indicating absence of the matching information through the communication I/F 36.

Following S111, S112, or a negative determination in S109 that no confirmation signal is received (S109: NO), in S113, the CPU 31 determines whether a termination instruction is entered. If the CPU 31 determines that no termination instruction is entered (S113: NO), the CPU 31 returns to S101 and repeats the determinations in S101, S107, S109, and S113. If the CPU 31 determines that a termination instruction is entered (S113: YES), the CPU 31 ends the main process.

Figure 7:
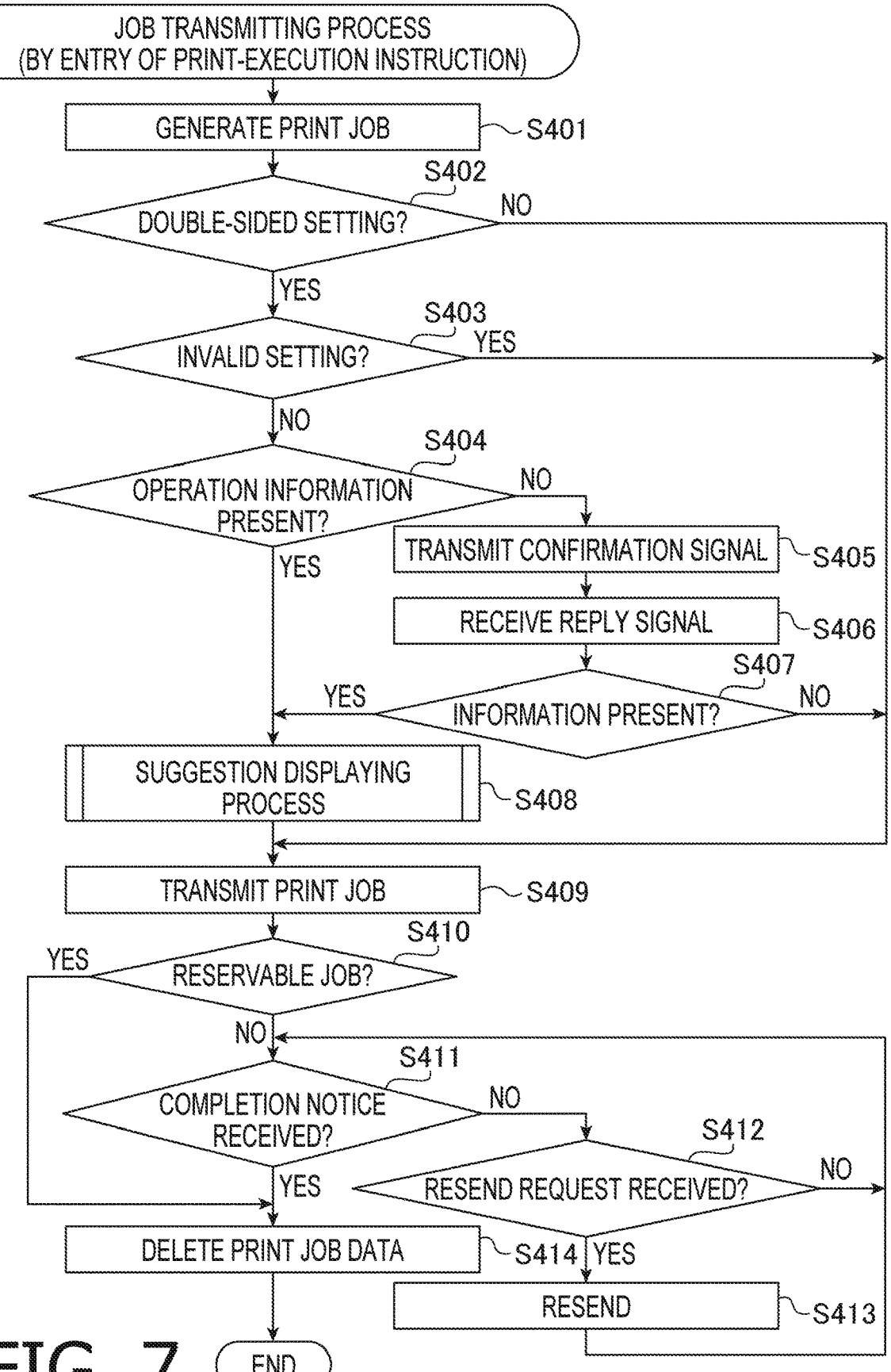
FIG. 7 is a flowchart to illustrate steps in a job-transmitting process to be conducted in the MFP according to the embodiment of the present disclosure.

Next, with reference to FIG. 7, described below will be a job transmitting process to be conducted in the PC 200. The PC 200 may have, for example, as shown in FIG. 1, the editor application 141 being an application program installed in the non-volatile memory 14 to edit documents and images and may accept an execution instructing operation to instruct the MFP 100 to execute image printing for the documents and the images. The job transmitting process activated in response to the execution instructing operation rendered through the application program such as the editor application 141 and is conducted by the CPU 11 of the PC 200 to transmit the print job data to the MFP 100.

In S401, the CPU 11 generates a print job based on a print instruction entered through the application program. In S402, the CPU 11 determines whether the print setting for the generated print job is double-sided printing. If the CPU 11 determines that the print setting for the generated print job is double-sided printing (S402: YES), in S403, the CPU 11 determines whether an invalidation setting is stored in the non-volatile memory 14. The invalidation setting is a setting not to display a message that inquires of the user whether the print setting should be changed. As will be described further below, the CPU 11 may receive an invalidation instruction to invalidate display of the message, and the CPU 11 receiving the invalidation instruction may store information concerning the invalidation in the non-volatile memory 14. In other words, if the CPU 11 received an invalidation instruction in S403 the job transmitting process conducted in the past, the information of the invalidation setting may be stored in the non-volatile memory 14.

In S403, if the CPU 11 determines that no invalidation setting is stored in the non-volatile memory 14 (S403: NO), in S404, the CPU 11 determines whether the operation information is stored in the non-volatile memory 14. The operation information may be transmitted from the MFP 100 in either S206 in the in-printing changing process (see FIG. 5) or in S306 in the reservable job printing process (see FIG. 6). The PC 200 receiving the operation information from the MFP 100 may store the operation information in the non-volatile memory 14.

If the CPU 11 determines that no operation information is stored in the non-volatile memory 14 (S404: NO), in S405, the CPU 11 transmits a confirmation signal to the MFP 100 through the communication I/F 16. The confirmation signal is a signal to inquire of the MFP 100 whether the MFP 100 has experienced an operation to change the print setting rendered through the user I/F 37. As described earlier, the MFP 100 experienced the change of the print setting from double-sided printing to single-sided printing before or in midst of image printing for a print job transmitted from the PC 200, which is the sender of the confirmation signal, may store information to identify the PC 200 as the setting-change experience information 341. In this regard, the MFP 100 receiving the confirmation signal transmits a different reply signal to the PC 200 depending on absence or presence of the information to identify the PC 200 in the setting-change experience information 341 through S110-S112 in the main process (see FIG. 4).

Following S405, in S406, the CPU 11 receives a reply signal from the MFP 100 through the communication I/F 16. In S407, the CPU 11 determines whether the received reply signal indicates presence of the identifying information. If the CPU 11 determines that the received signal indicates presence of the identifying information (S407: YES), or in S404, if the CPU 11 determines that the operation information is stored in the non-volatile memory 14 (S404: YES), in S408, the CPU 11 conducts a suggestion displaying process, in which the user is suggested to change the print setting from double-sided printing to the single-sided printing.

Figure 8:
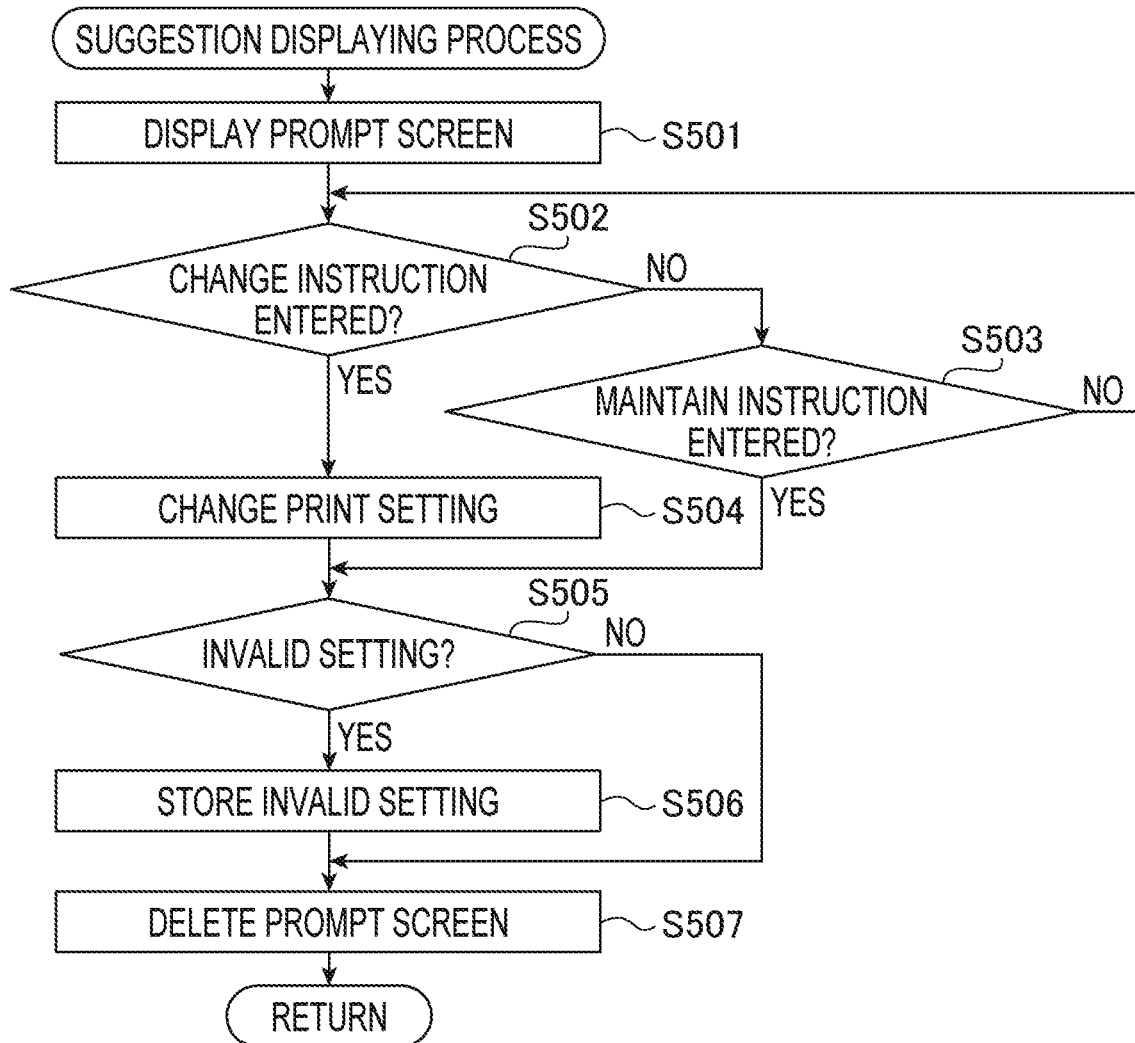
FIG. 8 is a flowchart to illustrate steps in a suggestion displaying process to be conducted in the MFP according to the embodiment of the present disclosure.
Figure 9:
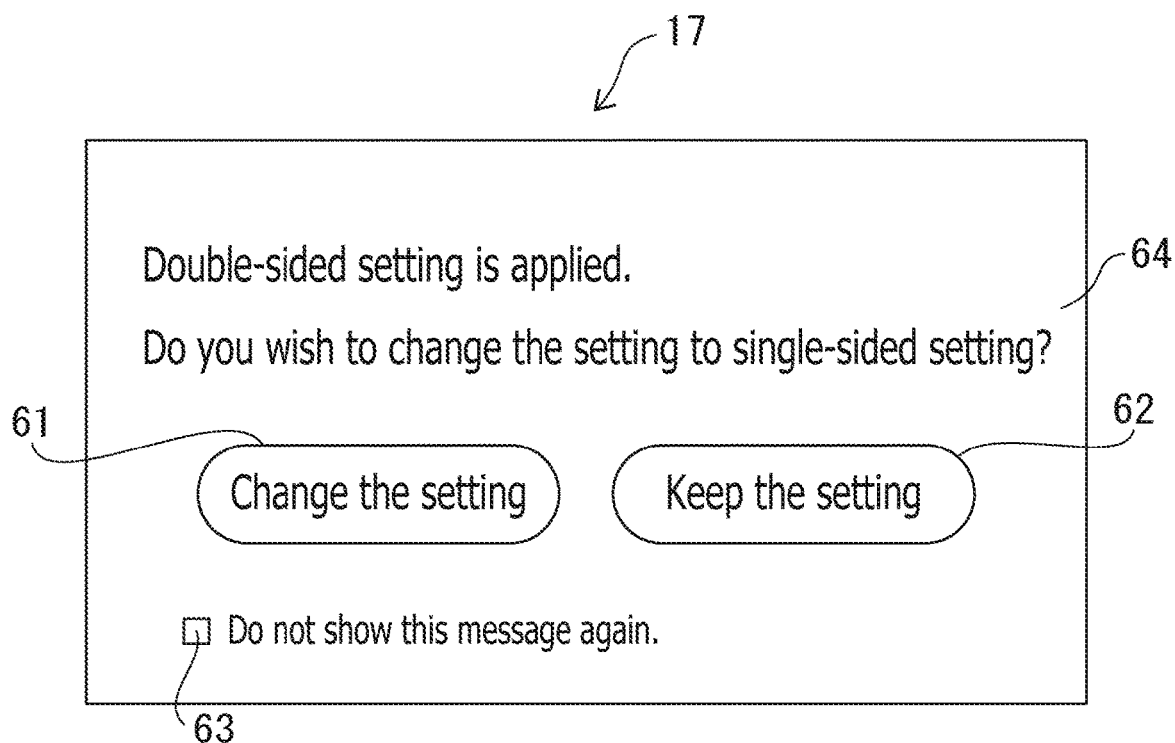
FIG. 9 is an illustrative view of a prompt screen to be displayed in a display in an external device according to the embodiment of the present disclosure.

Next, with reference to FIG. 8, described below will be the suggestion displaying process to be conducted in the PC 200. In S501, the CPU 11 controls the display 17 to display a suggestion screen that suggests the user to change the print setting from double-sided printing to single-sided printing. For example, the CPU 11 may display a screen 64 containing a button 61, through which an instruction for changing the print setting to the single-sided printing is acceptable; a button 62, through which an instruction for maintaining the print setting as double-sided printing; and an instruction box 63, through which an invalidation instruction for invalidating the suggestion screen from being displayed in a future occurrence of the suggestion displaying process is acceptable, in the display 17. With the screen 64, the PC 200 may inform the user of the current print setting of double-sided printing and suggest the user to change the print setting to single-sided printing.

In S502, the CPU 11 determines whether an operation to the button 61 in the screen 64 is rendered. In this regard, the operation to the button 61 includes instructing for changing the print setting. If the CPU 11 determines that no operation to the button 61 is rendered (S502: NO), in S503, the CPU 11 determines whether an operation to the button 62 is rendered. In this regard, the operation to the button 62 includes instructing for not changing but maintaining the print setting. If the CPU 11 determines that no operation to the button 62 is rendered (S503: NO), the CPU 11 returns to S502 and waits until an operation to either the button 61 or the button 62 is rendered.

In S502, if the CPU 11 determines that an operation to the button 61 is rendered S502: YES), in S504, the CPU 11 changes the print setting for the print job generated in S401 in the job transmitting process (see FIG. 7). In particular, the CPU 11 changes the print setting from double-sided printing to single-sided printing.

Following S504, or an affirmative determination in S503 that an operation to the button 62 is rendered (S503: YES), in S505, the CPU 11 determines whether an instruction for invalidating the suggestion screen from being displayed is entered through the instruction box 63 in the screen 64. If the CPU 11 determines that the instruction for invalidating the suggestion screen from being displayed is entered (S505: YES), in S506, the CPU 11 stores the setting to invalidate display of the suggestion screen in the non-volatile memory 14. Thereby, in the job transmitting process in a next and later occurrence, the CPU 11 may make an affirmative determination in S403 (S403: YES). Thus, the PC 200 may apply the setting to invalidate display of the screen 64 in the next or later occurrence, and the user may be released from being bothered by the screen 64.

Following S506 or a negative determination in S505 that no invalidation instruction for invalidating display of the suggestion screen is entered (S505: NO), in S507, the CPU 11 controls the display 17 to close the screen 64 having been displayed since S501 and exits the suggestion displaying process. The flow returns to the job transmitting process (see FIG. 7).

Referring back to FIG. 7, the job transmitting process will further be described. Following one of the suggestion displaying process in S408, a negative determination in S402 that that the print setting for the generated print job is not double-sided printing (S402: NO), an affirmative determination in S403 that the invalidating setting is stored in the non-volatile memory 14 (S403: YES), and a negative determination in S407 that the received signal indicates absence of the identifying information (S407: NO), in S409, the CPU 11 transmits the print job data to the MFP 100 through the communication I/F 16.

In S410, the CPU 11 determines whether the transmitted print job is a reservable print job. If the CPU 11 determines that the print job is not a reservable print job (S401: NO), in S411, the CPU 11 determines whether a completion notice indicating completion of the image printing for the transmitted print job is received from the MFP 100. If the CPU 11 determines that no completion notice is received (S411: NO), in S412, the CPU 11 determines whether the resend request requesting for sending the print job data once again to the MFP 100 is received from the MFP 100. The resend request may be transmitted from the MFP 100 in S208 in the in-printing changing process (see FIG. 5).

If the CPU 11 determines that no resend request is received (S412: NO), the CPU 11 returns to S411 and waits until either a completion notice or a resend request is received. If the CPU 11 determines that a resend request is received (S412: YES), in S413, the CPU 11 transmits the print job data once transmitted in S409 again to the MFP 100 through the communication I/F 16.

In S410, meanwhile, if the CPU 11 determines that the print job is a reservable print job (S410: YES), or in S411, if the CPU 11 determines that a completion notice is received (S411: YES), in S414, the CPU 11 deletes the transmitted print job data from the RAM 13 and ends the job transmitting process.

As has been described, in the image forming system according to the present embodiment, the MFP 100 may receive the print job data from the PC 200. If the received print job is a reservable print job, and if the print setting for the reservable print job is double-sided printing, the MFP 100 may display the screen 53 (see FIG. 2) to wait for the print instructing operation to the button 51, through which the operation to change the print setting and the print instructing operation may be rendered, and the button 52, through which the print instructing operation may be rendered without changing the print setting. If an operation to the button 51 is rendered, the MFP 100 may execute image printing for the print job with the print setting changed from double-sided printing to the single-sided printing. On the other hand, if an operation to the button 52 is rendered, the MFP 100 may execute image printing for the print job with the print setting unchanged from the double-sided printing. In this regard, in order to cause the MFP 100 to print images for the received reservable print job in either double-sided printing or single-sided printing, the user may merely operate one of the buttons 51, 52 being displayed in the screen to accept the print instructing operation. Therefore, the user is not forced to search for a preferable print setting item among a plurality of print setting items or a preferable parameter among a plurality of parameters. In this regard, a user who may not have enough experience or knowledge about the print settings may still change the print setting for the print job from double-sided printing to the single-sided printing by the simple operation. Thus, the user may be prevented from being frustrated by complicated print settings.

Moreover, in recent years, because low power consumption is encouraged and a faster printing operation is positively accepted, the print setting of double-sided printing may tend to be applied more often as a default setting in a printer driver. In such a case, a user who is accustomed to the print setting of single-sided printing may receive a dissatisfying result printed in double-sided printing undesirably for the initial use of the image forming apparatus. In other words, the user may start printing images without being aware of the print setting of double-sided printing. In this regard, the button enabling a change to the print setting for the print job that has already started may enable the user to notice the current print setting of double-sided printing and allows the user to change the print setting by the operation to the button. In other words, the print setting may be changed in a less complicated fashion, and the user may avoid receiving of the undesired or unintended outcome.

Moreover, information indicating the past experience of the operation to the button 51 indicating the user's preference for the print setting of single-sided printing may be transmitted to the PC 200 so that the print job with the print setting of double-sided printing to the MFP 100 regardless of the user's preference to single-sided printing may be restrained from being transmitted to the MFP 100.

Moreover, the information indicating the past experience of the operation to the button 51 may be stored in the MFP 100 so that, for example, the MFP 100 may transmit the reply signal to the PC 200 based on the stored information in response to the confirmation signal transmitted from the PC 200. Therefore, the PC 200 receiving the reply signal may restrain transmission of the print job with the print setting of double-sided printing.

Moreover, while image printing for a non-reservable print job with the print setting of double-sided printing is in progress, the screen 55 with the button 54 may be displayed. If the user operates the button 54 before completion of the image printing, the MFP 100 may abort the image printing in double-sided printing and start the same image printing in single-sided printing. Thus, the user may change the print setting for the print job from double-race printing to single-sided printing with the easy operation as soon as the user notices, even after the MFP 100 accepts and starts the print job 100.

Optionally, the MFP 100 may complete the image printing in progress on a page in the current print setting, and after finishing printing the image on the current sheet, the MFP 100 may change the print setting before starting to printing a next image on a next sheet. Thus, image printing for the unprinted pages in the print setting of single-sided printing may be achieved in the simple controlling flow, and the print job may be completed in shorter time.

Optionally, the MFP 100 may start printing the images for the same print job in double-sided printing from the beginning for the first page. Therefore, the user may, if desires, achieve the printed material all printed in single-sided printing.

Meanwhile, if a number of unprinted pages is smaller, a time period required to complete the image printing for the unprinted pages may be shorter, and a time period, in which the user may operate the button 54 even if the screen 55 is displayed to the user, may be insufficient. The user failing to operate the button 54 due to the short period of displaying the screen 55 may be dissatisfied. In this regard, the MFP 100 may not display the screen 55 when the number of unprinted pages is smaller than the predetermined number. Thus, the user may be prevented from the potential dissatisfaction.

Moreover, if a printable amount per unit of time for a print job is larger, and a printing speed is faster, a time period required to complete the image printing for the unprinted pages in the print job may be shorter, and a time period, in which the user may operate the button 54 even if the screen 55 is displayed to the user, may be insufficient. The user failing to operate the button 54 due to the short period of displaying the screen 55 may be dissatisfied. In this regard, the MFP 100 may not to display the screen 55 when the number of unprinted pages is smaller than the predetermined number so that the user may be prevented from the potential dissatisfaction.

Moreover, the PC 20 may display the screen 64. Therefore, through the screen 64, the print setting may be changed even before the print job is transmitted to the MFP 100. Further, the screen 64 may include the instruction box 63; therefore, the screen 64 may be restrained from being displayed repeatedly to bother the user.

Although an example of carrying out the invention have been described, those skilled in the art will appreciate that there are numerous variations and permutations of the image forming apparatus and the image forming system that fall within the spirit and scope of the disclosure as set forth in the appended claims. It is to be understood that the subject matter defined in the appended claims is not necessarily limited to the specific features or act described above. Rather, the specific features and acts described above are disclosed as example forms of implementing the claims. For example, the technics described above may not necessarily be applied to an MFP but may be applied to apparatuses that may print an image, such as a printer, a copier, and a facsimile machine.

For another example, the changeable print setting may not necessarily be limited to changing from double-sided printing to single-sided printing but may include, for example, changing from high-resolution printing to low-resolution printing, or changing from multicolor printing to monochrome printing. Moreover, the changeable print setting may not necessarily be limited to a single print setting item but a plurality of print setting items may be changeable. For example, a print setting applied differently from that in an older model within the same setting item may be changeable, and a print setting newly introduced in the current model may be changeable.

Figure 10:
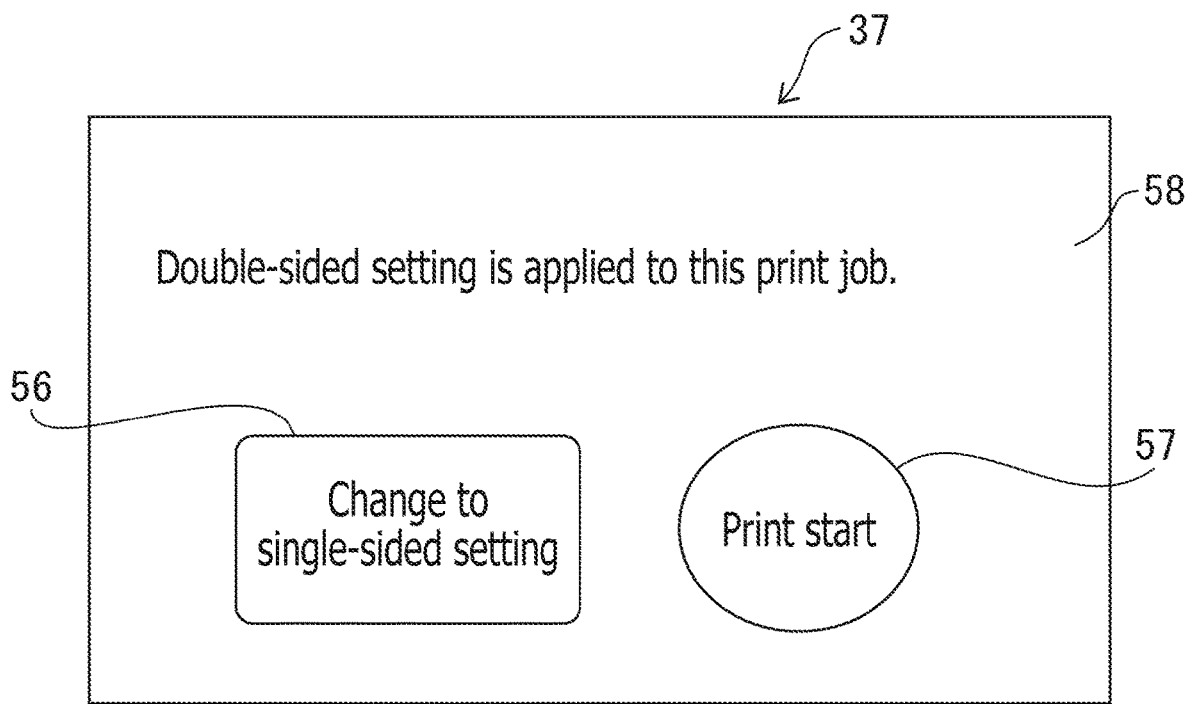
FIG. 10 is another illustrative view of a screen including a button, through which an instruction for changing a print setting to single-sided printing is acceptable, according to the embodiment of the present disclosure.

For another example, contents of the screens that may be displayed in the user I/F 37 and the display 17 may not necessarily be limited to those as illustrated in the accompanying drawings. For example, in S302 in the reservable job printing process, the CPU 11 may display a screen 58, as shown in FIG. 10, containing a button, through which a change to the print setting is acceptable, and a button 57, through which a print execution instruction is acceptable, in place of the screen 53.

For another example, the user I/F 37 may not necessarily be a touch panel but may be an operation panel having a display screen, through which user's input is not acceptable, and buttons, through which user's input is acceptable. In such a configuration, the CPU 31 may, for example, determine that an operation for changing the print setting is rendered when specific one of the buttons is operated.

For another example, the in-printing changing process (see FIG. 5) may not necessarily be conducted when an execution instruction for a reservable print job includes an instruction for not changing but maintaining the current print setting. In other words, the step S311 in the reservable job printing process may be skipped.

Moreover, the information indicating the experience of changing the print setting may not necessarily be stored in the MFP 100 and transmitted to the PC 200. In other words, the information may be stored in the MFP 100 while not being transmitted to the PC 200, or the information may not be stored in the MFP 100 while being transmitted to the PC 200. For example, the MFP 100 may not necessarily transmit the operation information upon changing the print setting, in other words, the MFP 100 may skip S206 in the in-printing changing process or S306 in the reservable job printing process; meanwhile, the PC 200 may not necessarily determine presence or absence of the operation information in S404 in the job transmitting process. For another example, the MFP 100 may not necessarily store the information identifying the external device or transmit the reply signal to the PC 200, in other words, the MFP 100 may skip S205 in the in-printing changing process or S305 in the reservable job printing process and may skip S111 and S112 in the man process; meanwhile, the PC 200 may not necessarily transmit the confirmation signal to the MFP 100 in S405 in the job transmitting process.

For another example, the operation information transmitted from the MFP 100 to the PC 200 may explicitly indicate the change in the print setting from one to another or may solely indicate a result of the operation.

For another example, the PC 200 may not necessarily display the screen 64 when the operation information is saved or when the reply signal indicating presence of the information is received. In other words, the print setting may be changed from double-sided printing to single-sided printing automatically without inquiring the user about preference through the screen 64.

Moreover, the steps in the flowcharts described above may not necessarily be processed in the fixed order as described above but may be processed in a different order or partly in parallel unless the alteration causes contradiction in the processes.

Moreover, the steps or the processes in the flowcharts described above may be accomplished by a single CPU, a plurality of CPUs, a hardware device such as an ASIC, or a combination of any of these. For another example, the steps or the processes in the above-described embodiment may be accomplished by various media or methods, including a recording medium storing the programs to implement the steps or the processes.

What is claimed is:

1. An image forming apparatus, comprising:
    a communication interface;
    an image forming device;
    a user interface;
    a memory; and
    a controller configured to:
        in response to receiving of reservable print job data constituting a reservable print job through the communication interface, execute a print standby screen displaying process, in which the controller controls the user interface to display a print standby screen, the user interface displaying the print standby screen being acceptable of an execution instructing operation for the reservable print job rendered in the print standby screen, the controller being configured to control the user interface to display a specific object in the print standby screen on condition that the received reservable print job data indicates a first parameter being applied to the received reservable print job, the reservable print job being a print job to be saved temporarily in the memory without being used for image printing by the image forming device directly upon reception through the communication interface but to be used by the image forming device for image printing in response to the executing instructing operation accepted through the user interface; and
        in response to the execution instructing operation being rendered through the user interface without accompanying an operation to the specific object in the print standby screen, execute a reservation printing process, in which the controller controls the image forming device to print images for the reservable print job, in compliance with the first parameter, the controller being configured to, in response to the operation to the specific object in the print standby screen and the execution instructing operation being rendered through the user interface, execute the reservation printing process in compliance with the second parameter.

2. The image forming apparatus according to claim 1, wherein the controller is configured to, in response to the operation rendered to the specific object in the print standby screen through the user interface, execute a reservable job operation occurrence transmitting process, in which the controller transmits operation occurrence information to an external device being a sender of the reservable print job data through the communication interface, the operation occurrence information indicating a past experience of the operation rendered to the specific object, the operation occurrence information being information to suggest the external device receiving the operation occurrence information to apply the second parameter to a new print job.

3. The image forming apparatus according to claim 1,
wherein the controller is configured to, in response to the operation rendered to the specific object in the print standby screen through the user interface, store operation experience information in the memory in association with identifying information of an external device being a sender of the reservable print job data, the operation experience information indicating a past experience of the operation rendered to the specific object; and
wherein the controller is configured to, in response to receiving of a confirmation signal from a predetermined external device through the communication interface, execute a reservable job reply transmitting process, in which the controller transmits a reply signal to the predetermined external device through the communication interface, the reply signal indicating presence or absence of the operation experience information associated with the predetermined external device in the memory, the confirmation signal being a signal transmitted to the image forming apparatus from the predetermined external device when a new print job with the first parameter applied thereto is accepted in the predetermined device, the confirmation signal including identifying information of the predetermined external device, the controller being configured to, on condition that identifying information matching with the identifying information of the predetermined external device included in the confirmation signal is stored in the memory, transmit the reply signal indicating presence of the operation experience information to the predetermined external device through the communication interface in the reservable job reply transmitting process, the controller being configured to, on condition that no identifying information matching with the identifying information of the predetermined external device included in the confirmation signal is stored in the memory, transmit the reply signal indicating absence of the operation experience information to the predetermined external device through the communication interface in the reservable job reply transmitting process.

4. The image forming apparatus according to claim 1,
wherein a plurality of items of print settings are applicable to the print job, each one of the plurality of items of print settings having the first parameter and the second parameter; and
wherein applying one of the first parameter and the second parameter in one of the plurality of items of the print settings to the print job invalidates the other of the first parameter and the second parameter.

5. The image forming apparatus according to claim 1,
wherein the first parameter is double-sided printing, and
wherein the second parameter is single-sided printing.

* * * * *